United States Patent [19]

Willow

[11] 4,252,084
[45] Feb. 24, 1981

[54] MULTIPLE PURPOSE SAFETY LEASH

[76] Inventor: Steven A. Willow, 4936 Sea Wolf Dr., Santa Rosa, Calif. 95405

[21] Appl. No.: 935,870

[22] Filed: Aug. 22, 1978

[51] Int. Cl.³ .............................................. A01K 27/00
[52] U.S. Cl. ....................................... 119/96; 119/109
[58] Field of Search ........................ 119/109, 96; 54/34

[56] References Cited

U.S. PATENT DOCUMENTS

| 2,909,154 | 10/1959 | Thomas | 119/109 |
| 3,003,466 | 10/1961 | Matarazzo | 119/96 |
| 3,491,726 | 1/1970 | Partin | 119/96 |
| 3,948,222 | 4/1976 | Longshore et al. | 119/96 |

Primary Examiner—Hugh R. Chamblee

[57] ABSTRACT

A multiple purpose leash arrangement for restraining animals, and in particular dogs, safely in an open bed of a pickup truck is described. The leaders of the leash also combine to form tethers of various lengths for restraining the animal outside of the vehicle.

8 Claims, 4 Drawing Figures

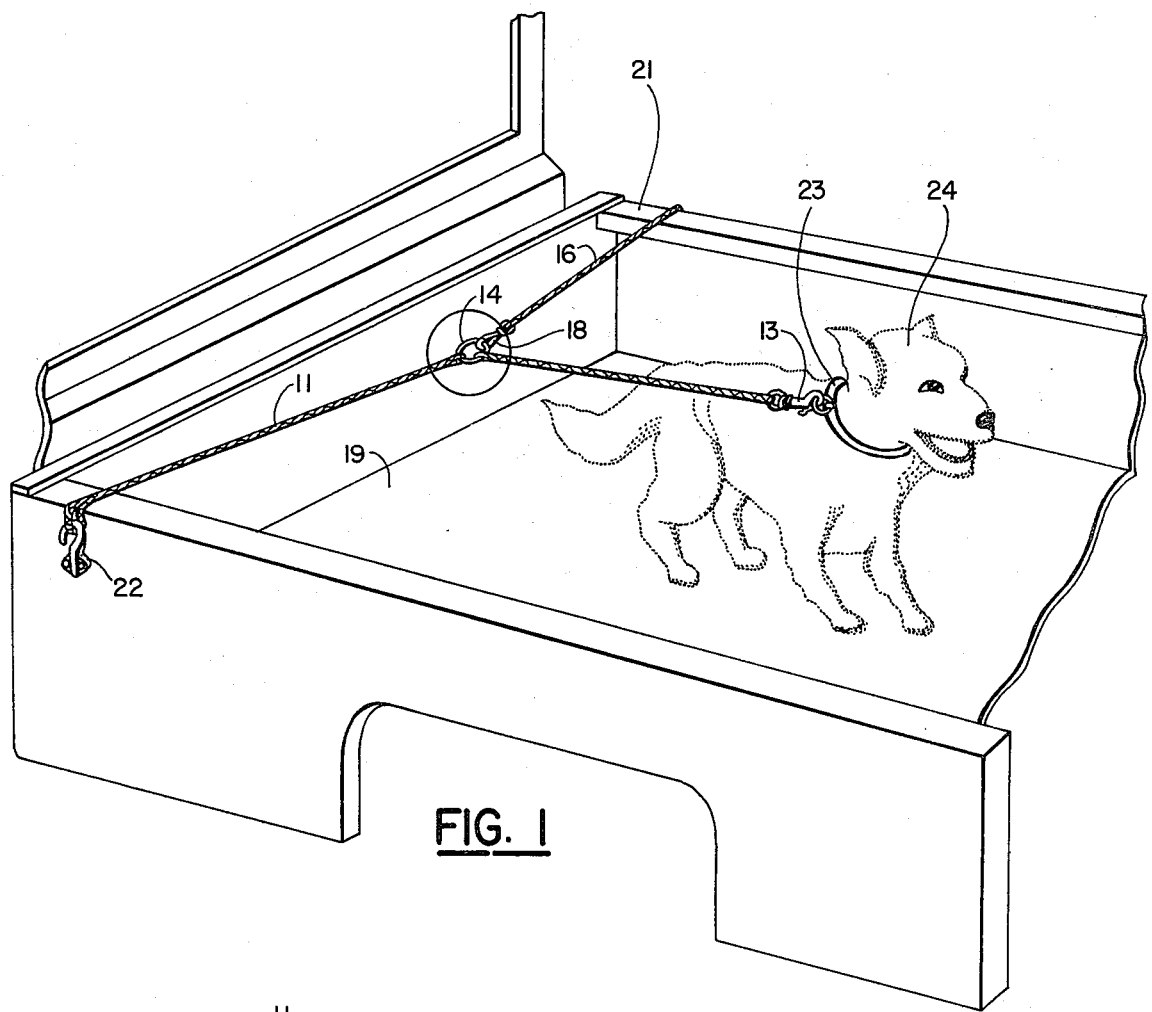
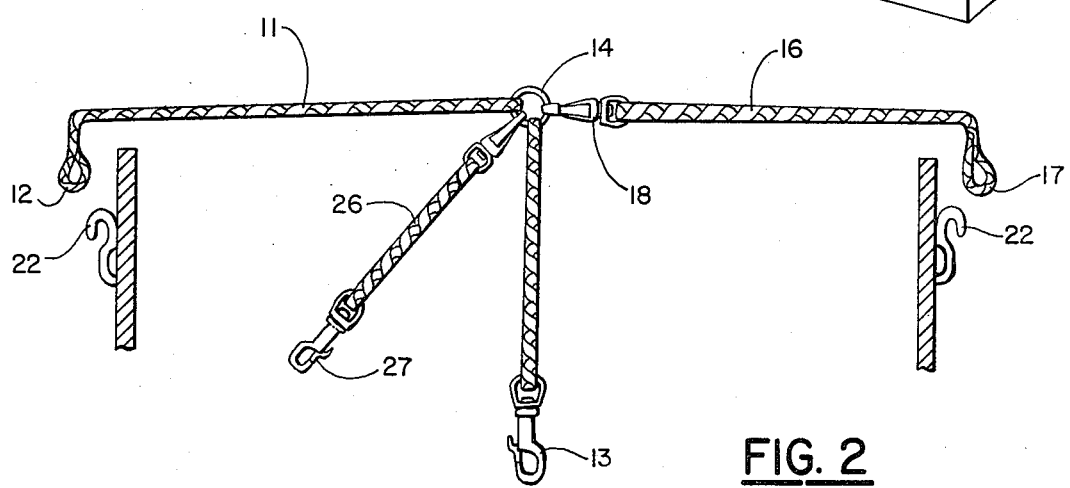

MULTIPLE PURPOSE SAFETY LEASH

BACKGROUND OF THE INVENTION

1. Field of Invention

The invention relates to a multiple purpose leash arrangement for safely restraining animals, and in particular dogs, in an open bed of a truck, and for forming tethers of various lengths for restraining the animal outside of the truck.

2. Description of the Prior Art

Various strap, tie-down and leash arrangements exist for restraining animals in vehicles. For example: U.S. Pat. No. 3,003,466 describes a fixture within a passenger vehicle to which a leash is secured for restraining an animal in a car. Another approach is described in U.S. Pat. No. 2,909,154 in which a base strap is secured around a vehicle seat and a tether strap with snap hooks at either end secures the animal to the base strap.

The principal disadvantage of such existing leash arrangements for restraining animals in vehicles relates to the length of the leader securing the animal to the tether point. Specifically, it must of necessity be relatively short, otherwise the animal may be able to jump or be thrown out of the vehicle and be dragged along by the leash or tether and the shortness of the leader renders it essentially useless for any other purpose.

SUMMARY OF THE INVENTION

A multiple purpose leash arrangement for safely restraining an animal in the open bed of a truck and for combining into a tether of various lengths for restraining the animal outside of the vehicle is described. The invented leash arrangement is adapted to be used in combination with hooks mounted on the side of the truck bed. When installed on the truck for restraining an animal, looped ends of the respective leaders are secured to the hooks mounted on the truck bed. A snap ring of a short leader is secured to a ring integral with a long leader, and a snap hook of the long leader is secured to the collar of the animal. The length between the snap ring and the ring of the long leader is sufficiently short to prevent the animal from being thrown or from jumping over the side of the truck bed.

When used to restrain the animal off of the truck bed, the short leader may be used as a short leash, the long leader may be used as a long leash, or the short and long leaders may be connected together to provide an extra long tether for the animal.

DESCRIPTION OF DRAWINGS

FIG. 1 shows a perspective view of the invented multipurpose safety leash restraining a dog in the open bed of a pickup truck.

FIG. 2 is a cross sectional view of the multipurpose safety leash installed on the bed of a pickup truck.

DESCRIPTION OF PREFERRED EMBODIMENTS

Figure 3:
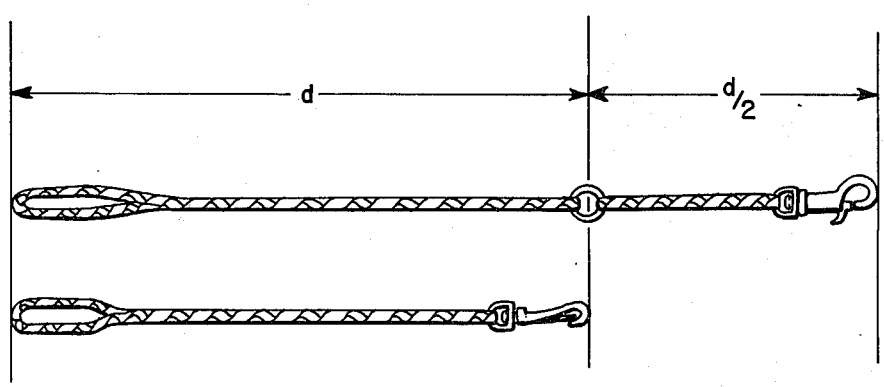
FIG. 3 shows the respective leaders not connected together, showing the respective dimensions of the long and short leaders.

Referring now to FIGS. 1, 2 and 3, the invented multipurpose safety leash includes a long leader 11 having a loop 12 at one end, a snap hook 13 at the other end, and a circular ring 14 incorporated into the leader at a point approximately one-third of the length of the long leader 11 from the snap hook 13 end. The short leader 16 includes a loop 17 at one end and a snap hook 18 at the other end. For purposes of this description, the lengths of the respective leaders 11 and 16 include that of the snap hooks 13 and 18 and of the loop 12 and 17. As shown in FIG. 3, the distance including the loop 12 of the long leader 11 and the ring 14 is equal to that of the short leader 16. The distance d including loop 12 and the ring 14 of the long leader 11 should equal approximately one half of the distance between hooks 22 mounted on either side of the truck bed 19 proximate the forward end of the bed 19.

When mounted on the bed 19 of a truck 21 as shown in FIGS. 1 and 2, the loops 12 and 17 of the long and short leaders 11 and 16 are secured around hooks 22 mounted on the side of the truck bed 19. The snap hook 18 of the short leader 16 is hooked onto the circular ring 14 of the long leader 11 to form a base perpendicularly across the width of the truck bed 19. The ring 14 provides a tether point approximately in the center of the bed 19. The portion of the long leader 11 between the snap hook 13 and the ring 14 is secured to a collar 23 around the neck of the animal, in this case a dog 24. The length of the portion of the long leader 11 between the circular ring 14 and the snap hook 13 should be such that the dog 24 cannot touch the side of the truck bed 19, and in most cases, a length approximately one quarter of the width of the truck bed 19 has been found suitable. When mounted in the truck bed 19, extra leaders 26 with snap hooks 27 at either end may be used to secure additional animals to the circular ring 14. The length of the extra leaders should be such that the tethered animal cannot touch the side of the truck bed 19.

Figure 4:
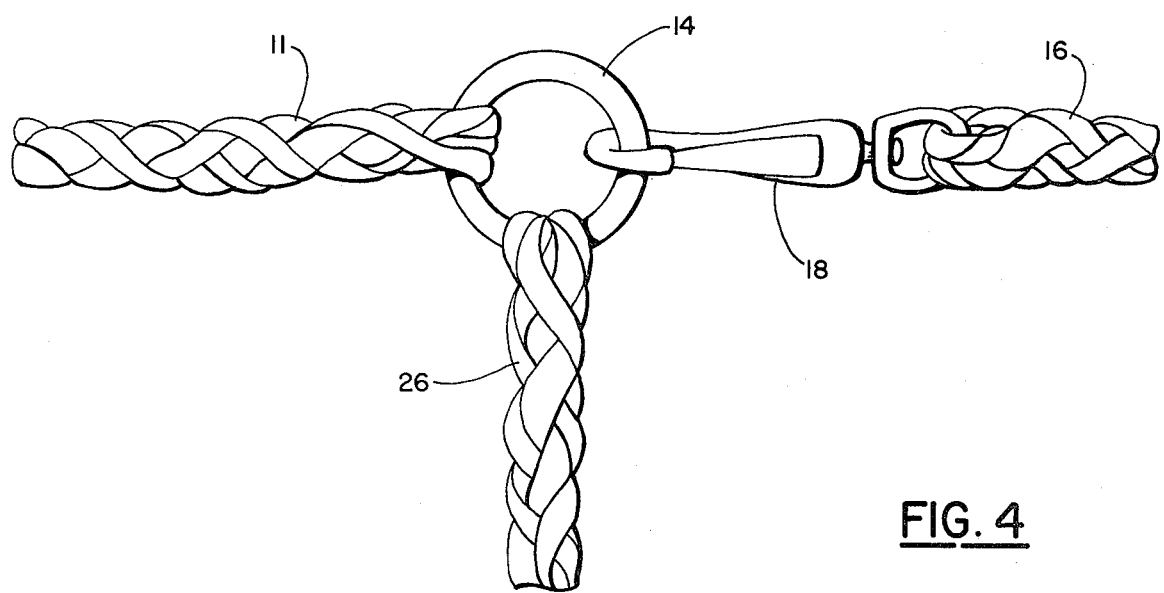
FIG. 4 shows an enlarged view of the circled area of FIG. 1.

Referring now to FIG. 4, for maximum strength and versatility, the circular ring 14 should actually form an integral part of the long leader 11 such that the portions of the long leader 11 secured to either side of the ring are free to slide around the ring. This feature minimizes the probability of the long leader 11 breaking at the circular ring 14. Specifically, any tension exerted by the animal on the respective leaders 11, 16 and 26 will always be axially aligned with those respective portions.

The invented multiple purpose leash may also be used to restrain an animal outside of a vehicle. For example, the respective loop ends 12 and 17 of the long and short leaders 11 and 16 can be secured in the manner described to form a base tie and the animal secured to the snap hook 13 on the free end of the long leader 11. Also, the short leader 16 may be used by itself as a short hand leash and the long leader 11 may be used by itself as a long hand leash. Finally, the snap hooks 13 or 18 of either the long or short leader 11 or 16 can be secured to the loops 12 or 17 of the long or short leaders 11 or 16 to form a long tether, which in turn can be secured by the free loop end to a post, tree, etc.

The preferred material for the leaders 11, 16 and 26 is braided rope or line having high tensile strength. For example, I have found the braided nylon line manufactured under the trade name of "VELTEX" suitable. The circular ring should have an adequate diameter such that several snap hooks can be easily snapped onto and off of it. I have found rings with an inner diameter of one inch suitable. Finally, each snap hook 13, 22 and 27 should have a base swivel at the base of the hook to which the braided line or leader is secured. The use of snap hooks with freely swiveling loops bases eliminates twisting of the respective leaders.

While the invented multiple purpose safety leash is described with respect to a particular perferred embodiment, it should be apparent that numerous variations and modifications can be effected within the spirit and scope of the invention as described and as defined and set forth in the appended claims.

I claim:

1. A leash arrangement for safely securing an animal in an open truck bed comprising in combination, a long leader having a snap hook secured to one end, and a looped end, a ring incorporated as an integral part of said long leader, located one-third to one-half of the length of the long leader from the snap hook, a short leader having a snap hook secured to one end and a looped end and having a length equal to the distance from the ring and to the looped end of the long leader, hooks mounted on each side of the open truck bed proximate its forward end, said looped ends of the long and short leaders adapted to be secured by said hooks mounted on each side of the open truck bed, the snap hook secured to the short leader being hooked onto said ring to form a base tether across the width of the truck bed, the snap hook secured to the long leader being hooked onto a collar around the neck of an animal whereby said animal is secured approximately in the center of the truck bed proximate its forward end.

2. The leash arrangement of claim 1 wherein the long leader includes a base section measured from the ring to and including the looped end and a tether section measured from the ring to and including the snap hook, and wherein the base and tether sections are each independently secured to the ring to form the long leader.

3. The leash arrangement of claim 2 wherein said short leader and the base section of the long leader each have a length equal to one-half of the distance between said hooks mounted on each side of the truck bed.

4. The leash arrangement of claim 3 wherein the ratio of the lengths of the base and tether sections of the long leader is 2:1.

5. The leash arrangement of claim 2 wherein the base and tether sections of the long leader each slide freely around the ring.

6. The leash arrangement of claim 2 further including an extra leader having snap hooks secured at either end and having a length equal to that of the tether section, one snap hook adapted to hook onto said ring, the remaining snap hook adapted to hook onto a collar around the neck of a second animal.

7. The leash arrangement of claim 2 wherein said leaders are formed of a braided hollow core rope.

8. The leash arrangement of claim 2 wherein said ring has an inner diameter of at least one inch and wherein the snap hooks secured at the ends of the respective leaders each have a base swivel loop through which the respective ends of the leaders are secured.

* * * * *